(12) United States Patent
Dahm

(10) Patent No.: US 7,243,681 B2
(45) Date of Patent: Jul. 17, 2007

(54) CHECK VALVE

(76) Inventor: Peter Kasper Dahm, 58 Iris Road, Norwood, Johannesburg (ZA) 2192

( * ) Notice: Subject to any disclaimer, the term of this patent is extended or adjusted under 35 U.S.C. 154(b) by 0 days.

(21) Appl. No.: 11/156,713

(22) Filed: Jun. 20, 2005

(65) Prior Publication Data

US 2005/0263195 A1 Dec. 1, 2005

Related U.S. Application Data

(63) Continuation of application No. PCT/IB03/06080, filed on Dec. 19, 2003.

(30) Foreign Application Priority Data

Dec. 23, 2002 (ZA) .................................. 2002/8635

(51) Int. Cl.
*F16K 15/16* (2006.01)
*E03C 1/298* (2006.01)

(52) U.S. Cl. ...................................... 137/846; 137/843
(58) Field of Classification Search ......... 137/843–850
See application file for complete search history.

(56) References Cited

U.S. PATENT DOCUMENTS 803,979 A 11/1905 Bonnell
3,463,159 A 8/1969 Heimlich
3,967,645 A * 7/1976 Gregory ..................... 137/846
4,084,606 A 4/1978 Mittleman
4,227,533 A 10/1980 Godfrey
4,434,810 A * 3/1984 Atkinson .................... 137/493
5,301,707 A * 4/1994 Hofsteenge .................. 137/12

FOREIGN PATENT DOCUMENTS

| EP | 1 174 549 | | 1/2002 |
| GB | 754497 | | 8/1956 |
| GB | 2 296 309 | | 6/1996 |
| GB | 2 3320 310 A | * | 6/1998 |
| GB | 2 346 198 | | 8/2000 |
| GB | 2 352 497 | | 1/2001 |

* cited by examiner

*Primary Examiner*—Ramesh Krishnamurthy
(74) *Attorney, Agent, or Firm*—Volpe & Koenig PC

(57) ABSTRACT

A one-way valve which can be utilized in a toilet, particularly in a urinal, to prevent return flow of malodorous gases from the sewage system into the room wherein the toilet is installed has a body which is confined in the toilet. The body carries two sheet- or panel-shaped valving elements at least one of which is resilient to yield to the flow of urine but normally sealingly engages the other element to prevent the flow of gases from the sewage system counter to the direction of flow of the urine. At least one marginal portion of the at least one valving element is free to move away from the corresponding marginal portion of the other element to also permit lateral outflow of urine when the one element is at least partially out of contact with the other element.

20 Claims, 2 Drawing Sheets

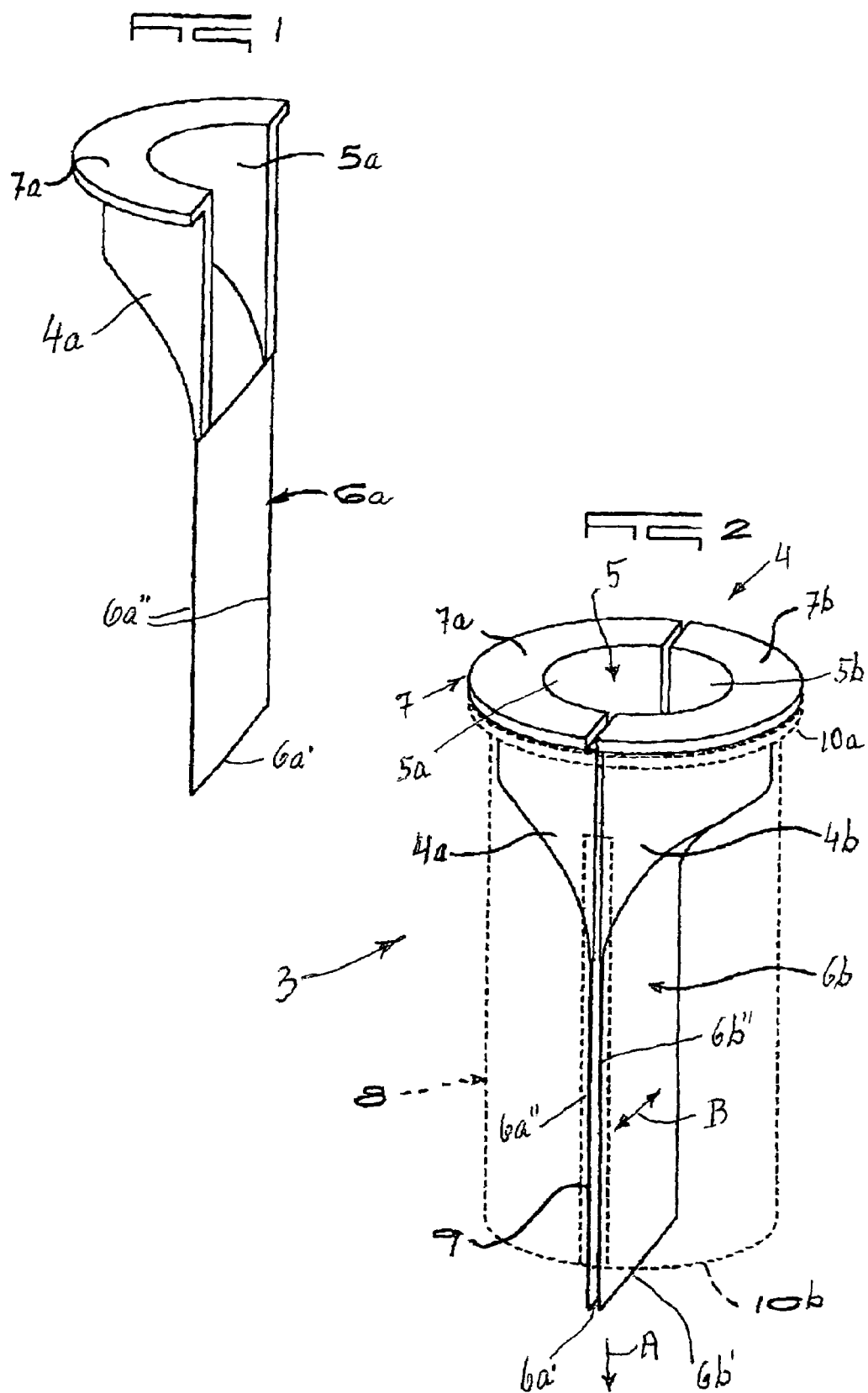

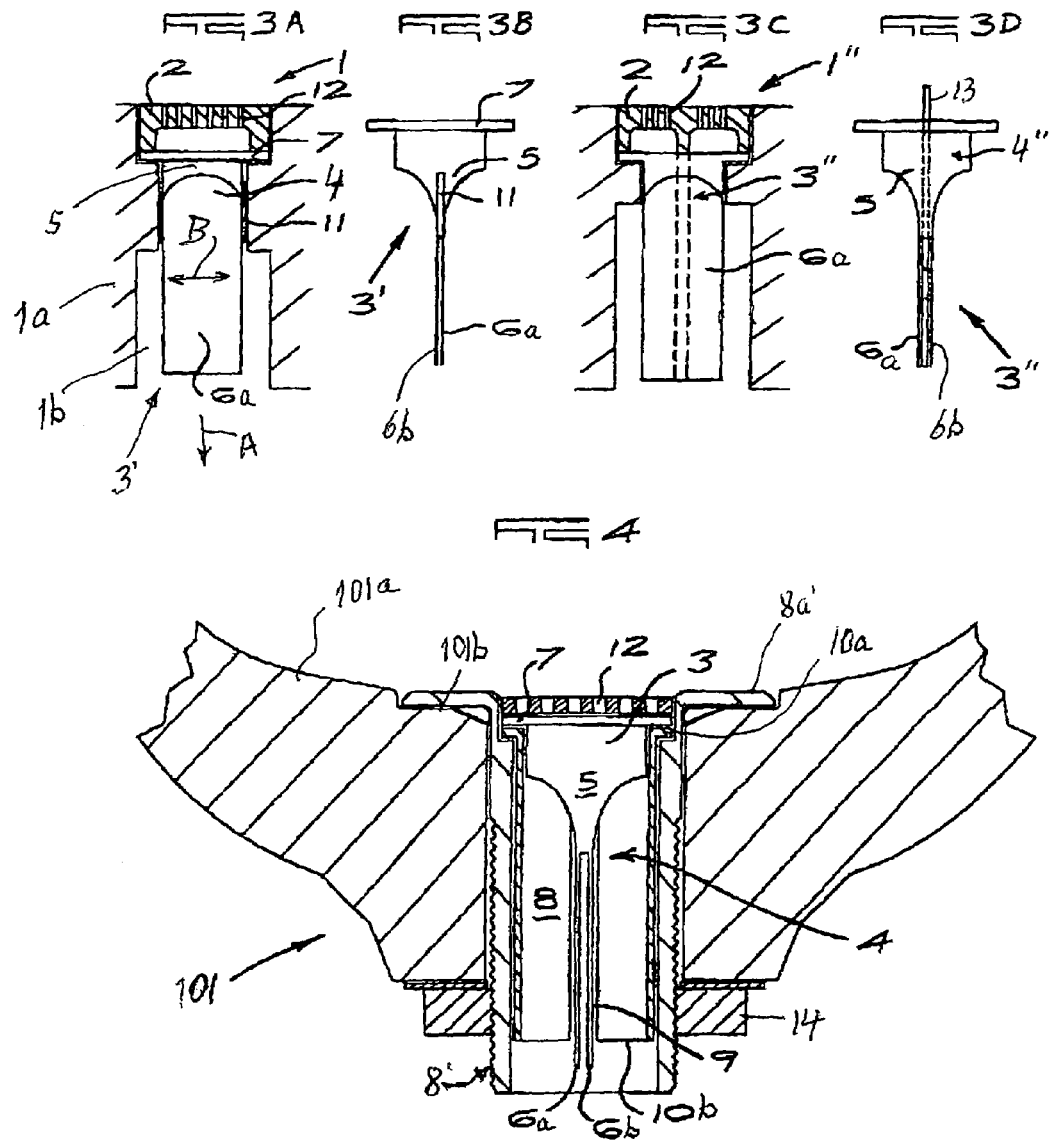

CHECK VALVE

CROSS-REFERENCE TO RELATED CASES

This application relies on the priorities of the commonly owned International Patent Application Serial No. PCT/IB03/6080, filed Dec. 19, 2003, and South African Patent Application Serial No. 2002/8635 filed Dec. 23, 2002.

BACKGROUND OF THE INVENTION

The present invention relates to improvements in check valves (also known as one-way valves) which permit the flow of fluid media in a first direction but prevent a return flow of such media in a second direction counter to the first direction.

U.S. Pat. No. 4,227,533 A (granted Oct. 14, 1980 to Godfrey) discloses a check valve wherein the outlet is defined by a tube adapted to be flattened for the purpose of preventing return flow of a fluid toward and into the inlet. This valve constitutes a further development of so-called drain tube valves which are employed in certain types of watercraft, e.g., in power boats. A drawback of such valves is that the flattened regions of the deformed tubular outlet tend to accumulate solid matter which adheres to the outlet and reduces the rate of fluid flow through the valve and also prevents adequate sealing of the outlet when the latter should prevent a return flow of fluids, especially gaseous fluids. Similar drawbacks are exhibited by numerous other conventional check valves including, for example, that disclosed in U.S. Pat. No. 6,401,266 and in European patent application Serial No. EP1 174 549 A2 of Senteur (published Jan. 23, 2002 and relying on the priority of the Netherlands patent application Serial No. NL 1015745 filed Jul. 19, 2002).

The above discussed conventional valves exhibit the additional drawback that solid matter tends to accumulate along the edges of the flattened tube, i.e., in the regions where the resiliency of the tube is less pronounced than elsewhere. Such deposits of solid matter reduce the resiliency of the adjacent portion of the tube and cannot be readily removed therefrom. The deposits of solid matter on the tube can rapidly gather into accumulations which suffice to permit a backflow of gaseous fluids, e.g., of noxious gases which gather in sewage systems.

U.S. Pat. No. 4,084,606 (granted Apr. 18, 1978 to Mittleman) discloses a fluid transfer device employing a so-called umbrella check valve which has first and second inlets and a duckbill-shaped outlet. The valving element of this valve permits the flow of a fluid from the first inlet to the second inlet and from the second inlet to the outlet but blocks the flow of fluid from the second inlet to the first inlet as well as from the outlet to both inlets. This check valve is intended to serve as a means for regulating the administration of liquid medicaments to a patient. Each half of the duckbill-shaped outlet is at least partially rigid.

An additional drawback of all presently known check valves which are known to the applicant and employ tubular or duckbill-shaped outlet defining devices is that such devices tend to collapse when the pressure differential between the inner side and the exterior of the outlet reaches a certain relatively low value. This can result in undesirable sealing of the outlet when such sealing is not desirable or dangerous. Attempts to avoid such untimely collapse of the outlet were unsuccessful if the check valve is to remain sufficiently sensitive, e.g., to open in response to the flow of urine therethrough but to invariably prevent the flow of malodorous gases in a direction counter to the flow of urine.

OBJECTS OF THE INVENTION

An object of the instant invention is to provide a novel and improved one-way valve or check valve which is more versatile than presently known check valves and can be utilized with particular advantage to prevent the flow of malodorous gaseous fluids from a sewage system through a urinal or other device for the collection and evacuation of solid and/or liquid bodily waste and into the space wherein the urinal is installed.

Another object of the present invention is to provide the check valve with a novel housing or body and with novel and improved means for invariably ensuring unidirectional flow of one or more fluids in the housing.

A further object of the invention is to provide a toilet which embodies the improved one-way valve.

An additional object of the invention is to provide a simple and inexpensive but highly reliable one-way valve adapted to be put to use in presently known urinals or other contrivances which must invariably ensure unidirectional flow of of fluids therethrough.

Still another object of the invention is to provide the one-way valve with novel and improved means for reliably confining gaseous and/or liquid fluids to flow only in a desired direction and for ensuring such unidirectional flow for extended periods of time.

Another object of the present invention is to provide a novel and improved one-way valve which permits only gravitationally induced flow of one or more fluids, such as urine.

An additional object of the invention is to provide a toilet (such as a urinal) with novel and improved means for properly positioning and confining the above outlined one-way valve therein.

A further object of the invention is to provide a check valve which comprises a small number of relatively simple parts, which can be put to use in conventional arrangements (such as urinals), and which can be rapidly and conveniently replaced with a new valve without necessitating resort to special tools or other implements.

Another object of the invention is to provide novel and improved means for regulating the flow of gaseous and/or liquid fluids in regions where uncontrolled admission of one or more fluids would render the region uninhabitable or unpleasant to the occupants.

An additional object of the invention is to provide a check valve or one-way valve which can stand long periods of use (e.g., in a lavatory) without any changes of its ability to regulate (such as prevent) the flow of one or more fluids into a certain area.

A further object of the invention is to provide a check valve which overcomes at least some drawbacks of the aforediscussed conventional check valves but is and remains sufficiently sensitive to prevent the flow of certain fluids counter to a selected direction.

An additional object of the invention is to provide a novel and improved urinal.

SUMMARY OF THE INVENTION

The invention is embodied in a one-way valve or check valve which comprises a body having a first end and a second end and defining a fluid flow path extending from the first end toward the second end, a substantially strip-shaped first valving element which is provided at the second end and extends away from the first end of the body, and a second valving element which is borne by the body and normally sealingly engages the first valving element to prevent the outflow of fluid from the path. At least one of the valving elements consists of a material which is sufficiently resilient to move away from the other valving element in response to the flow of fluid along the path and thence between the valving elements.

One of the valving elements can constitute or at least approximate a mirror image of the other valving element. The body of the improved valve can have an annular shape and can comprise two sections which are or can be at least substantial mirror images of each other.

The body and the valving elements can be installed in a portion of a toilet to prevent the flow of malodorous gases between the valving elements and into the path when the second element sealingly engages the first element.

A presently preferred use of the improved check valve is in a urinal wherein the body is installed to permit the flow of urine in a direction along the path and thereupon between the valving elements but to prevent the flow of malodorous gases which issue from the sewage system counter to such direction. The urinal can include or contain an at least substantially tubular enclosure which at least partially surrounds the valving elements and which can also surround at least the second end of the body of the improved valve. The enclosure can be provided with at least one guide slot and at least one of the valving elements can include a lateral portion which is received in the slot at least when the valving elements sealingly engage each other.

The urinal or the body of the valve can be provided with first guide means and the body or the urinal is then provided with second guide means cooperating with the first guide means to maintain the body in a predetermined position relative to the urinal. The first guide means can comprise at least one projection, and the second guide means is then provided with a recess for such projection. For example, the projection can include a pin or a rib.

The body of the improved valve can comprise first and second sections which define the aforementioned path and respectively carry the first and second valving elements. Such sections of the valve body can constitute or approximate mirror images of each other and can be bonded to one another.

The body of the valve can be provided with an external flange which can abut one end of the aforementioned tubular enclosure when the valve is installed in such enclosure.

At least one of the valving elements can have a thickness which at least approximates 0.2 mm, and at least a portion of the valve body can have a thickness at least approximating 0.8 mm. At least one of the valving elements can be of one piece with the body and at least one of the valving elements can have an at least substantially square or rectangular outline.

The improved valve can be constructed and assembled in such a way that the at least one valving element is movable away from the other valving element to permit the fluid to flow between the two elements in a first direction away from the second end of the body as well as in at least one second direction transversely of the first direction.

The body of the improved valve, the first valving element and/or the second valving element can consist at least in part of a suitable elastomeric material, such as a plastic material.

The novel features which are considered as characteristic of the invention are set forth in particular in the appended claims. The improved one-way valve itself, however, both as to its construction and the methods of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 1 is a perspective view of a portion of a check valve or one-way valve which embodies one form of the present invention;

FIG. 2 is a perspective view of the valve which embodies the structure of FIG. 1 and is installed in a tubular enclosure of a urinal;

FIG. 3A is a fragmentary sectional view of a urinal which embodies a second valve constituting a modification of the one-way valve of FIG. 2;

FIG. 3B is a side elevational view of the valve which is shown in FIG. 3A;

FIG. 3C is a view similar to that of FIG. 3A but showing a portion of a modified urinal containing a one-way valve which is identical with or constitutes a modification of the valve shown in FIG. 2 or 3B;

FIG. 3D shows the valve of FIG. 3C turned through an angle of 90°; and

FIG. 4 is a greatly enlarged view of a portion of a modified urinal containing a one-way valve which is or which can be identical with the valve of FIG. 2.

DESCRIPTION OF PREFERRED EMBODIMENTS

Referring to FIGS. 1 and 2, there is shown a check valve or one-way valve 3 comprising a housing or body 4, a first rectangular flap- or sheet-like valving element 6a which is carried by a first substantially trough-shaped section 4a of the body 4, and a second valving element or flap 6b which is a mirror image of the element 6a and is borne by a second trough-shaped section 4b of the body 4.

The body 4 can constitute a plastic molding, e.g., an elastomeric synthetic plastic component, and each of the valving elements (hereinafter mostly called flaps for short) 6a, 6b can but need not be an integral part of the respective trough-shaped section 4a, 4b of the body 4. In the embodiment of FIGS. 1 and 2, the two sections or halves 4a, 4b of the body 4 are bonded to each other by a suitable adhesive and define a fluid flow path 5 which extends from an inlet to an outlet of the body 4. The inlet is located between two semicircular flanges 7a, 7b of the respective halves 4a, 4b, and the outlet is located at those ends of the halves 4a and 4b which carry the flaps 6a, 6b. When the halves: 4a, 4b are bonded to each other, the two semicircular flanges 7a, 7b together form a circumferentially complete washer-like flange 7.

In accordance with a feature of the present invention, the flaps 4a, 4b normally abut each other face-to-face (see FIG. 2) so that they prevent the penetration of a gaseous fluid into the outlet of the path 5. However, at least one of the flaps 6a, 6b is sufficiently resilient to move away from the other flap when the path 5 receives a flow of a fluid (such as urine) in a direction (see the arrow A in FIG. 2) from the inlet toward the outlet of the path. This enables the fluid to issue from the valve 3 in a first direction (as indicated in FIG. 2 by the aforementioned arrow A) as well as transversely of the first direction as indicated by the double-headed arrow B. Thus, a fluid can issue from the valve 3 by flowing beyond those (first) marginal portions 6a', 6b' of the flaps 6a, 6b which are remote from the path 5, as well as beyond at least one of the two second (lateral) marginal portions 6a'', 6b'' of the respective flaps 6a, 6b. The pairs of lateral marginal portions 6a'', 6b'' extend from the sections or halves 4a, 4b of the body 4 toward the respective first (transverse) marginal portions 6a', 6b'.

The flexibility of at least one of the flaps 6a, 6b practically eliminates the likelihood of accumulation of solid matter at the confronting sides of the flaps which, in turn, prevents gaseous fluids (e.g., malodorous gases in a sewage system) from flowing first between the flaps 6a, 6b and thence into the two mirror symmetrical portions 5a, 5b of the path 5. The flow of noxious gases into the path 5 could take place if the valve 3 could not prevent their flow into the interior of the body 4, i.e., such gases could penetrate from the sewage system into the area around the urinal. The portions 5a, 5b of the path 5 are defined by the body sections 4a, 4b, respectively.

A portion of a urinal 1 is shown in FIG. 3A. This urinal comprises a bowl 1a defining a passage 1b for reception of a modified valve 3' which latter, when properly installed, is overlapped by a customary cover grid 12. The grid 12 overlies the flange 7 which, in turn, overlies an internal shoulder 2 of the bowl 1a. When the urinal 1 is in use, urine flows through the grid 12, into the path 5 and thereupon between the valving elements or flaps 6a, 6b (only one shown in FIG. 3A) at least one of which yields and permits urine to flow in the direction indicated by the arrow A and/or B, i.e., into the sewage system. However, once the flow of urine is terminated, the flap 6a and/or 6b immediately reassumes its sealing position so tha the valve 3' prevents any flow of malodorous gases from the sewage system into the path 5 and thence into the room accommodating the urinal 1.

For example, at least one of the flaps 6a, 6b can have a thickness at least approximating 0.2 mm, and at least a portion of the body 4 can have a thickness in the range of 0.8 mm. As shown in FIGS. 1 and 2, the flaps 6a, 6b merge into the adjacent end portions of the respective halves 4a, 4b of the body 4. It is presently preferred to select the dimensions and the material of the halves 4a, 4b in such a way that the finished housing 4 is sufficiently rigid to be self-supporting. As already mentioned hereinbefore, the body 4 can consist of a single piece of a suitable material, and such single piece can be integral with at least one of the flaps 6a, 6b. If the valve 3 or 3' includes a one-piece body 4, the latter can be connected with at least one of the flaps 6a, 6b during the making of the body in a suitable mold or in a subsequent step.

FIG. 3B shows the one-way valve 3' prior to insertion into the urinal 1 of FIG. 3A and turned through 90° relative to the position shown in FIG. 3A. The difference between the valves 3 and 3' is that the body or housing of the latter valve comprises longitudinally extending projections 11 in the form of ribs which are received in complementary recesses or grooves of the bowl 1a. The ribs 11 replace the tubular enclosure 8 of FIG. 2. An advantage of the valve 3' is that it can readily withstand pronounced and abrupt changes in pressure there-across such as could entail an undesirable pressure increase at the outlet of the valve 3' and the resulting collapse of one or the other or both flaps 6a, 6b longitudinally inwardly. A collapse of one or more parts of the check valve is a serious drawback of presently known check valves which are utilized in urinals.

The ribs 11 of the check valve 3' are disposed diametrically opposite each other at the junctions of the flaps 6a, 6b with the respective sections or halves of the housing or body 4 of this valve. Such ribs are or can be of one piece with the body 4. It is also possible to provide the ribs 11 or analogous projections on the urinal for the valve 3' and to provide the recesses for such projections in the body of the valve. Still further, it is within the purview of the present invention to provide one or more projections and one or more recesses on the urinal and complementary recesses and projections on the body of the check valve.

The valve 3 or 3' can be securely held in the urinal by employing a suitable adhesive which bonds the body to the bowl. However, the ribs 11 (or their equivalents render it possible to avoid bonding of the housing 4 of the valve 3' to the bowl 1a if they are received in the complementary grooves or recesses of the bowl with a requisite degree of friction. It is also clear that the body 4 of the valve 3 can also comprise suitable ribs or analogous projections which are a friction fit in complementary longitudinal grooves or recesses of the enclosure 8 of FIG. 2. It is even possible to omit the step of bonding the halves 4a, 4b of the housing 4 of the valve 3 to each other if these halves have ribs (such as or corresponding to the ribs 11 shown in FIGS. 3A and 3B) which are held in the bowl of the urinal with a requisite degree of friction.

A further possibility of securely locating the improved check valve (3") in a urinal is shown in FIGS. 3C and 3D. The housing or body 4" of the valve 3" has an eccentric pin-shaped projection 13 which extends in a direction away from the flaps 6a, 6b and is receivable in a complementary hole of the grid 12 forming part of the urinal 1". Alternatively, the projection can be provided on the grid and is then receivable in a complementary recess or hole or socket of the body 4". Still further, it is possible to provide one or more pins on the grid 12 as well as on the body 4".

FIG. 4 shows a portion of a modified urinal 101 which accommodates a check valve 3 similar to or identical with the valve 3 of FIGS. 1 and 2. The bowl 101a of the urinal 101 contains an externally threaded tubular member 8'" having a flange 8a' which overlies a shoulder 101b in the bowl 101a. The lower end portion of the member 8' extends beyond the bowl 101a and mates with a nut 14 which urges the flange 8a' against the shoulder 101b. The member 8' has an internal shoulder for the end portion 10a of the enclosure 8, and such end portion supports the flange 7 of the body 4 of the valve 3. The lower end portions of the flaps 6a, 6b extend beyond the lower end portion 10b of the tubular member 8'. The grid 12 is fitted into the upper end portion of the hollow tubular member 8'.

The mounting of the improved check valve 3, 3' or 3" in a urinal is a simple procedure. All that is necessary is to remove the grid 12 and to insert the valve into the bowl 1a or 1a or 101a. The flange 7 limits the extent of insertion of the valve body into the bowl of the urinal or into the enclosure 8. An appropriate sealant can be employed on the flange 7 and/or on the adjacent portion of the bowl. The grid 12 is then reinserted into the bowl and the urinal is ready for use. The apertures of the grid 12 direct streamlets of urine into the fluid flow path defined by the housing of the properly inserted check valve, and such streamlets descend by gravity and cause at least one of the flaps 6a, 6b to move away from the other flap so that the liquid can escape from the valve in the direction(s) indicated in FIGS. 2 and 3A by the arrows A and B. The displaced flap(s) returns or return to the sealing position(s) as soon as the flow of urine is interrupted. Therefore, malodorous gases in the region surrounding the flaps 6a, 6b cannot penetrate into the path 5 and thence into the room in which the urinal is installed. Even minor pressure differentials between the path 5 and the area surrounding the flaps 6a, 6b suffice to ensure immediate opening of the valve, and the tendency of the flaps to reassume their sealing positions is sufficiently pronounced to ensure immediate closing of the valve when the inflow of urine into the path 5 is interrupted or terminated.

The feature that the flaps 6a, 6b can permit outflow of urine in the direction indicated by the arrow A as well as in at least one of the directions indicated by the double-headed arrow B exhibits the advantage that solid matter which is entrained by urine is highly unlikely to gather at any part of the inner side of the flap 6a and/or 6b. This prolongs the useful life of the improved check valve. Such self-cleaning constitutes a highly desirable advantageous feature of the valve.

It will be appreciated that, even though it can be utilized with great advantage in urinals, the improved check valve can be employed in many other devices or apparatus wherein a gaseous and/or liquid fluid is to flow in a first direction but the valve prevents the flow of fluid in a second direction counter to the first direction. For example, the components of the improved check valve can be designed to stand pronounced fluid pressures before the flaps permit the outflow of such fluids, and the parts of the valve can be made of any one of a wide variety of suitable plastic and/or other materials. If only one of the flaps is to yield in response to the flow of a fluid into the path defined by the body of the improved valve, the other flap (or an equivalent thereof) can be made of a rigid material as long as it can be sealingly engaged by the yieldable flap when the check valve is to be closed.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A one-way valve, comprising: a body having a first end and a second end and defining a fluid flow path extending from said first end toward said second end; a substantially strip-shaped first valving element provided at said second end and extending away from said first end of said body; and a second valving element borne by said body and normally sealingly engaging said first element to prevent the outflow of a fluid from said path, at least one of said elements consisting of a material which is sufficiently resilient to move away from the other of said elements in response to the flow of fluid along said path and thence between said elements, wherein said at least one valving element is movable away from said other valving element to permit the fluid to flow between said elements in a first direction away from said second end of said body and in at least one second direction transversely of said first direction.

2. The valve of claim 1, wherein one of said valving elements at least approximates a mirror image of the other of said valving elements.

3. The valve of claim 1, wherein said body has an annular shape and comprises two sections which are at least substantial mirror images of each other.

4. The valve of claim 1, wherein said body and said valving elements are installed in a portion of a toilet to prevent the flow of malodorous gases between said valving elements and into said path when said second element sealingly engages said first element.

5. The valve of claim 1, wherein said body is installed in a urinal to permit the flow of urine in a direction along said path and thereupon between said elements but to prevent the flow of malodorous gases issuing from a sewage system counter to said direction.

6. The valve of claim 5 for use in a urinal having an at least substantially tubular enclosure at least partially surrounding said valving elements and surrounding at least said second end of said body.

7. The valve of claim 6, wherein said enclosure has at least one guide slot and at least one of said valving elements has a lateral portion received in said slot at least when said valving elements sealingly engage each other.

8. The valve of claim 5, wherein one of said body and said urinal has a first guide means and the other of said body and said urinal has second guide means cooperating with said first guide means to maintain said body in a predetermined position relative to the urinal.

9. The valve of claim 8, wherein said first guide means comprises at least one projection and said second guide means has a recess for said at least one projection.

10. The valve of claim 8, wherein said at least one projection includes one of a pin and a rib.

11. The valve of claim 1, wherein said body comprises first and second sections which define said path and respectively carry said first and second valving elements.

12. The valve of claim 11, wherein said sections of said body are at least substantial mirror images of each other.

13. The valve of claim 11, wherein said sections of said body are bonded to each other.

14. The valve of claim 1, wherein said body has an external flange and is installed in a tubular enclosure which is adjacent said flange.

15. The valve of claim 1, wherein at least one of said valving elements has a thickness at least approximating 0.2 mm.

16. The valve of claim 1, wherein at least a portion of said body has a thickness at least approximating 0.8 mm.

17. The valve of claim 1, wherein at least one of said valving elements is of one piece with said body.

18. The valve of claim 1, wherein at least one of said valving elements is a flexible sheet having an at least substantially square or rectangular outline.

19. The valve of claim 1, wherein at least a portion of at least one of said body, said first valving element and said second valving element consists of an elastomeric plastic material.

20. A one-way valve comprising:
   a body having a first end and a second end and defining a fluid flow path extending from said first end toward said second end;
   a substantially strip-shaped first valving element provided at said second end and extending away from said first end of said body; and
   a substantially strip-shaped second valving element, formed separately from the first valving element, borne by said body, and partially sealingly engaged to the first valving element along seams at edges of each of the first and second valving elements;
   wherein the sealingly engaged first and second valving elements prevent the outflow of a fluid from said path, at least one of said elements comprising a material that is sufficiently resilient to move away from the other of said elements in response to the flow of fluid along and transverse to said path and thence between said elements.

* * * * *